United States Patent
Balasubramaniam et al.

(10) Patent No.: US 7,722,310 B2
(45) Date of Patent: May 25, 2010

(54) SYSTEM AND METHOD FOR MEASURING CLEARANCE BETWEEN TWO OBJECTS

(75) Inventors: Mahadevan Balasubramaniam, Clifton Park, NY (US); Emad Andarawis Andarawis, Ballston Lake, NY (US); James Anthony Ruud, Delmar, NY (US); Samhita Dasgupta, Niskayuna, NY (US); Minesh Ashok Shah, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 1248 days.

(21) Appl. No.: 11/015,258

(22) Filed: Dec. 17, 2004

(65) Prior Publication Data
US 2006/0132147 A1    Jun. 22, 2006

(51) Int. Cl.
*F01D 11/20*    (2006.01)
(52) U.S. Cl. .............................. 415/14; 415/1; 415/13; 415/118; 415/173.1; 415/173.2; 416/31; 416/61; 324/662; 324/683; 324/76.77; 324/545
(58) Field of Classification Search ............. 415/1, 415/13, 14, 118, 173.1–173.3; 416/31, 61; 324/662, 683, 76.77, 545
See application file for complete search history.

(56) References Cited

U.S. PATENT DOCUMENTS

| 4,876,505 | A  | * | 10/1989 | Osborne ............... 324/207.25 |
| 5,070,302 | A  |   | 12/1991 | Marcus et al. ............ 324/662 |
| 5,119,036 | A  | * | 6/1992  | Rickards et al. ........... 324/662 |
| 5,166,626 | A  |   | 11/1992 | Hester et al. ............. 324/690 |
| 6,401,460 | B1 | * | 6/2002  | Xia ...................... 60/782 |
| 6,692,222 | B2 | * | 2/2004  | Prinz et al. ................ 415/14 |
| 7,098,673 | B2 | * | 8/2006  | Launay et al. ............. 324/658 |
| 7,180,305 | B2 | * | 2/2007  | Andarawis et al. .......... 324/667 |
| 2006/0097733 | A1 | * | 5/2006 | Roziere ................... 324/662 |

FOREIGN PATENT DOCUMENTS

FR    2826723 A1 * 1/2003
WO    WO-2004/020953 A1 * 3/2004

* cited by examiner

*Primary Examiner*—Christopher Verdier
(74) *Attorney, Agent, or Firm*—Patrick K. Patnode

(57) ABSTRACT

A system for measuring clearance between a first object and a second object is provided. The system includes a sensor configuration to generate a first signal representative of a first sensed parameter and a second signal representative of a second sensed parameter. The system also includes a clearance measurement unit configured to process the first and second signals based upon a ratiometric technique to calculate clearance between the first and second objects.

22 Claims, 10 Drawing Sheets

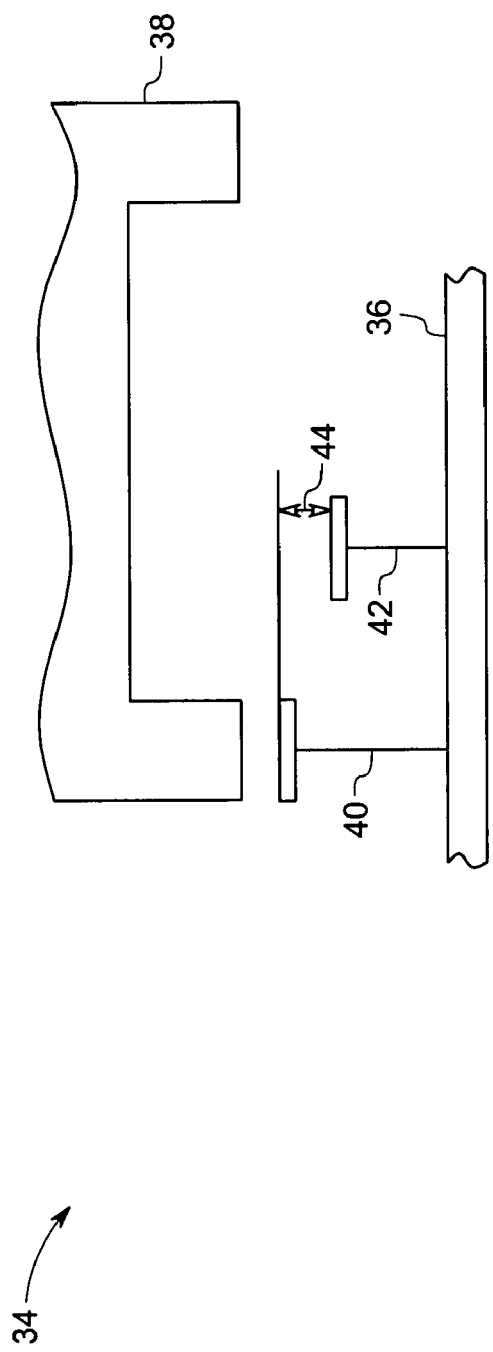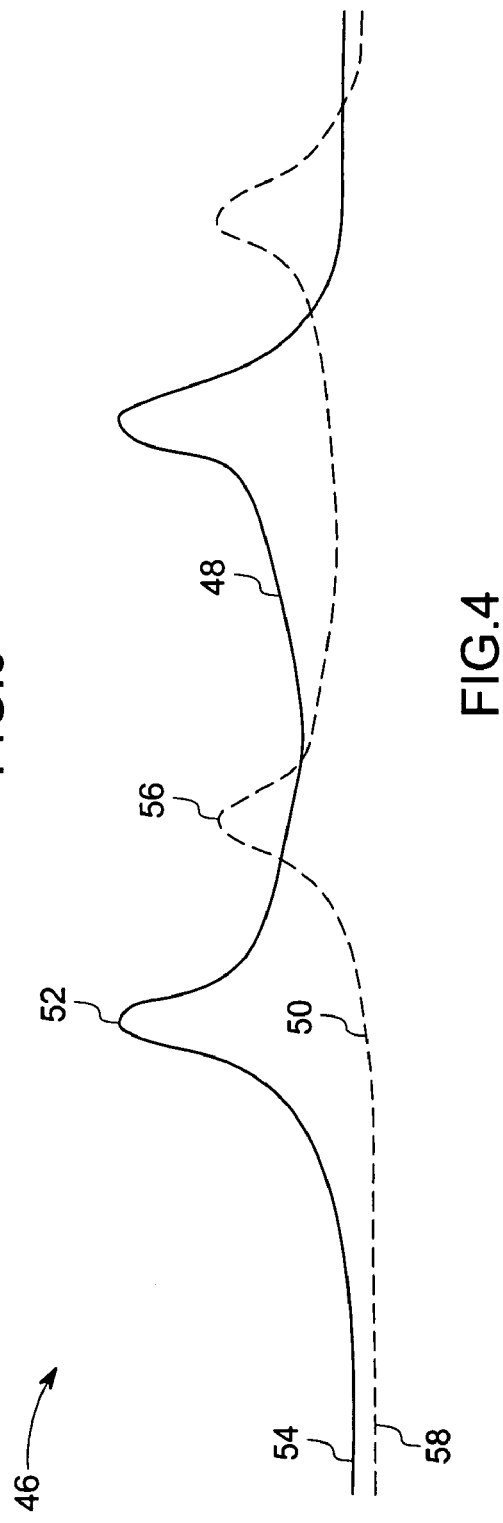

SYSTEM AND METHOD FOR MEASURING CLEARANCE BETWEEN TWO OBJECTS

BACKGROUND

The invention relates generally to sensor systems, and more particularly to a sensor system for measuring a clearance between two objects through a ratiometric technique.

Various types of sensors have been used to measure the distance between two objects. In addition, these sensors have been used in various applications. For example, a turbine has a turbine blade that is disposed adjacent to a shroud. The clearance between the turbine blade and the shroud varies depending on the temperature of the turbine blade. For example, the clearance between the shroud and the turbine blade is greatest when the turbine is cold and gradually decreases as the turbine heats up. It is desirable that a gap or clearance between the turbine blade and the shroud be maintained for safe and effective operation of the turbine. A sensor may be disposed within the turbine to measure the distance between the turbine blade and the shroud. The distance may be used to direct movement of the shroud to maintain the desired displacement between the shroud and the turbine blade.

In certain applications, a capacitance probe is employed to measure the distance between two objects. The probe is located on one of the objects and measures a capacitance with respect to the other object for estimating the clearance between the two objects. Unfortunately, existing direct measurement techniques employing a single probe for a single target object are relatively inaccurate where the target object changes its geometry during the course of measurement. For example, in a rotating component, such as a turbine blade, the geometry and position of the blade may change depending on various conditions. Such changes may result in a drift in the calibration of the probe. Further, noise due to thermal distortions in the wire connecting the probe to a clearance control unit may also results in inaccurate measurements.

Moreover, in certain applications such as gas turbines, such sensor systems are typically employed to measure clearances between parts during design and offline testing. Unfortunately, these sensor systems are not workable for in-service measurements due to the noise and drift generated by changes in geometry of the parts. Instead, in-service clearance control is based on the clearance measurements previously taken during design and testing of the parts. As the parts become worn during service, the offline measurements become ineffective for in-service clearance control.

Accordingly, a need exists for providing a sensor system that provides an accurate measurement of clearance between two objects by minimizing the effect of calibration drift and noise in a system. It would also be advantageous to provide a self-calibrating sensor system that could be employed for accurate clearance measurement for parts in operation.

BRIEF DESCRIPTION

In accordance with certain embodiments, the present technique has a system for measuring clearance between a first object and a second object. The system includes a sensor configuration to generate a first signal representative of a first sensed parameter and a second signal representative of a second sensed parameter. The system also includes a clearance measurement unit configured to process the first and second signals based upon a ratiometric technique to calculate clearance between the first and second objects.

In accordance with certain embodiments, a method of measuring clearance between a first object and a second object includes generating a first signal representative of a first sensed parameter from a sensor configuration proximate the first and second objects and generating a second signal representative of a second sensed parameter from the sensor configuration. The method also includes processing the first and second signals based upon a ratiometric technique to calculate the clearance between the first and second objects.

DRAWINGS

These and other features, aspects, and advantages of the present invention will become better understood when the following detailed description is read with reference to the accompanying drawings in which like characters represent like parts throughout the drawings, wherein:

FIG. 3 is a diagrammatical side illustration of the sensor system of FIG. 2 in accordance with an embodiment of the present technique;

FIG. 4 is a graphical representation of capacitance measured by the sensor system of FIG. 3 in accordance with embodiments of the present technique;

DETAILED DESCRIPTION

Figure 1:
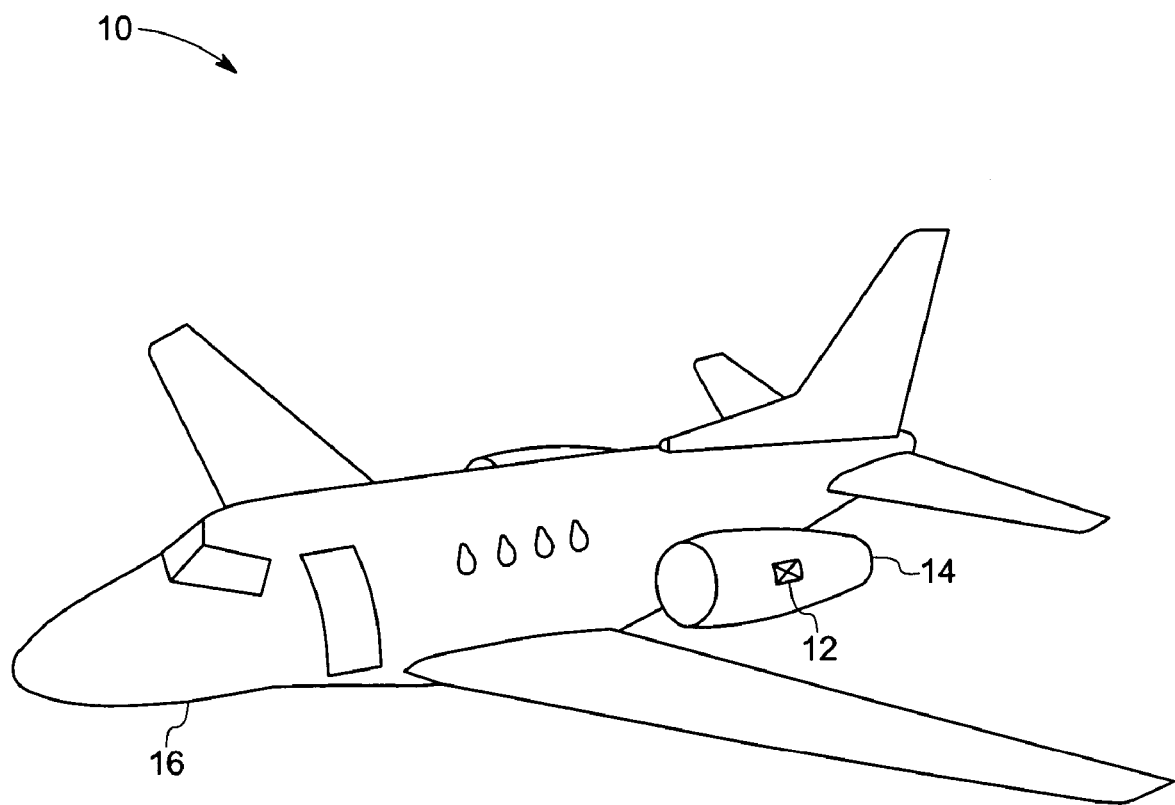
FIG. 1 is a diagrammatical perspective illustration of an aircraft having a sensor system in accordance with embodiments of the present technique.

As discussed in detail below, embodiments of the present technique function to provide an accurate measurement of clearance between two objects in various systems such as an aircraft engine, a steam turbine, and so forth. Referring now to the drawings, FIG. 1 illustrates an aircraft 10 having a sensor system 12 disposed in an aircraft engine 14 coupled to a body or frame 16 of the aircraft 10. In the illustrated embodiment, the sensor system 12 is configured for measuring a clearance between two objects, such as the clearance between a turbine blade and a shroud in the aircraft engine 14 as will be described in detail below with reference to FIG. 2.

Figure 2:
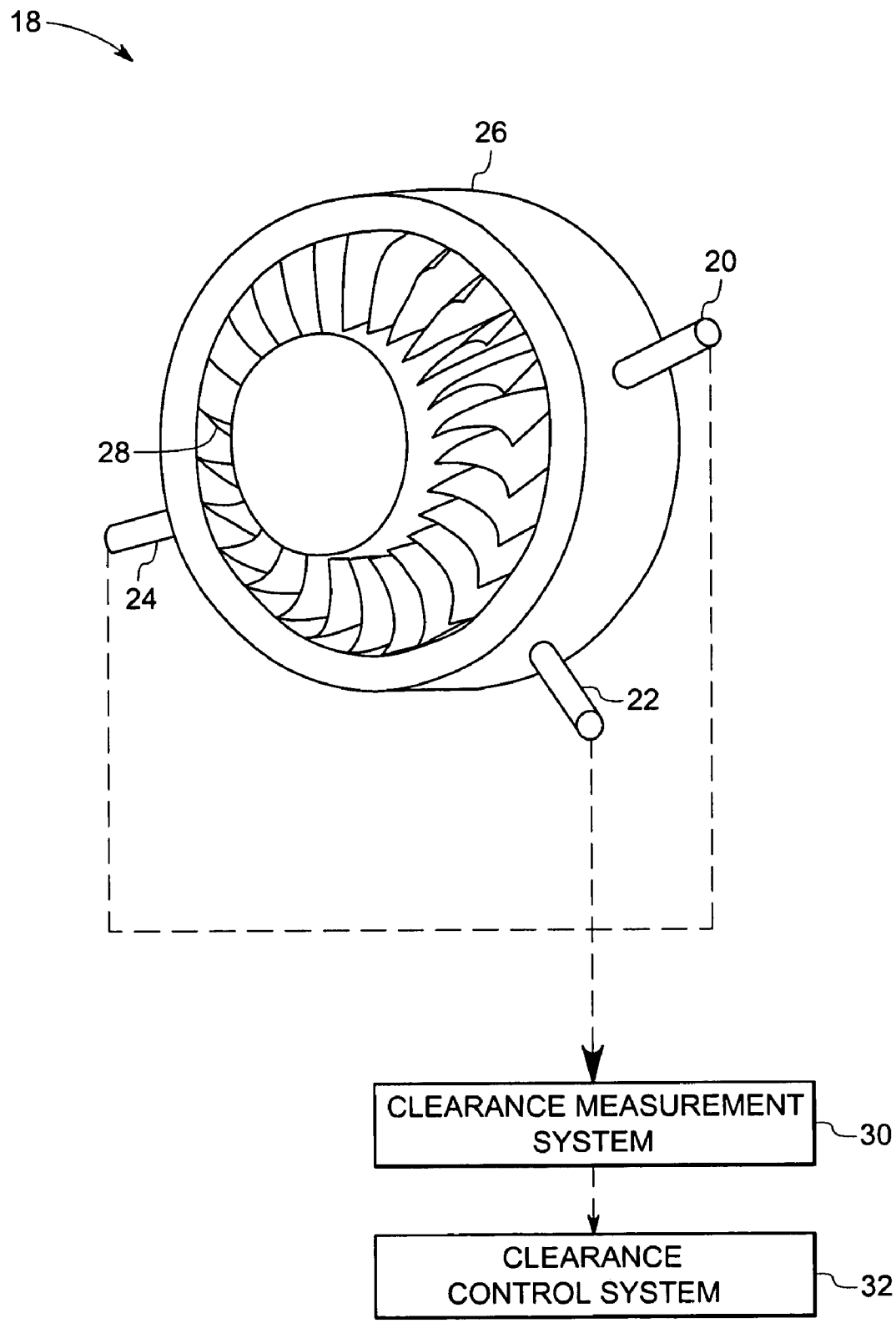
FIG. 2 is a diagrammatical perspective illustration of an engine having a sensor system in accordance with embodiments of the present technique.

FIG. 2 illustrates a rotating component, such as a turbine 18 of the aircraft engine 14, having a plurality of sensors 20, 22, and 24 for measuring the clearance between a casing 26 and a plurality of turbine blades 28 disposed within the casing 26. In this embodiment, three sensors 20, 22, and 24 are employed at three different locations for clearance measurement between the casing 26 and the plurality of blades 28. However, a greater or lesser number of sensors may be used in other embodiments. In the embodiment illustrated in FIG. 2, signals representative of the clearance are detected by the sensors 20, 22 and 24, and the signals are then transmitted to a clearance measurement system 30 to estimate a clearance between the casing 26 and the blades 28 at different locations. Further, the clearance measurement through the clearance measurement system 30 is used for controlling the clearance between the casing 26 and the turbine blades 28 via a clearance control system 32. In this embodiment, a ratiometric technique is employed for calculating the clearance from the signals received from the sensors 20, 22 and 24 as described in detail below.

FIG. 3 illustrates a sensor system 34 that employs a ratiometric technique for clearance measurement between first and second objects 36 and 38. In certain embodiments, the sensor system 34 is configured to measure the clearance as the first object 36 moves relative to the second object 38. For example, the first and second objects 36 and 38 may comprise moving and stationary components in an internal combustion engine, a turbine, an aircraft, an automobile, a power generation system and so forth. In one embodiment, the first object 36 is a rotating blade tip and the second object 38 is a casing of a turbine. In another embodiment, the first object 36 is a rotor bucket seal teeth and the second object 38 is casing of a power generation system.

The illustrated sensor system 34 of FIG. 3 comprises first and second sensors 40 and 42. In this embodiment, the first sensor 40 is disposed at a first location on the first object 36, and the second sensor 42 is disposed at a second location on the first object 36. The first sensor 40 is configured to generate a first signal representative of a first sensed parameter. Similarly, the second sensor 42 is configured to generate a second signal representative of a second sensed parameter. In the illustrated embodiment, the sensors 40 and 42 are capacitive probes, and the first and second sensed parameters are capacitances. In certain embodiments, the sensors 40 and 42 may include microwave based sensors, or optical sensors, or eddy current sensors, and the sensed parameters may include impedance, or a phase delay, or an induced current, respectively. Further, the first and second locations are positioned to have an offset 44 between the first and second locations to achieve a phase difference between capacitive waveforms generated from the first and second sensors 40 and 42, as will be described below with reference to FIG. 4.

Referring now to FIG. 4, capacitance measurements detected from the sensors 40 and 42 of FIG. 3 are represented by waveforms 46. The capacitive measurement from the first sensor 40 is represented by a waveform 48, and the capacitive measurement from the second sensor 42 is represented by a waveform 50. Further, maximum and minimum capacitances detected from the first sensor 40 are represented by reference numerals 52 and 54. Similarly, maximum and minimum capacitances detected from the second sensor 42 are represented by reference numerals 56 and 58. In the illustrated embodiment, the first signal generated from the first sensor 40 may include a noise component from the second sensor 42. Similarly, the second signal generated from the second sensor 42 may include a noise component from the first sensor 40. In this embodiment, the clearance between the first and second objects 36 and 38 is calculated by using the ratiometric technique to reduce the noise generated by either one of the sensors 40 and 42.

In the illustrated embodiment, the clearance between the first and second objects 36 and 38 is a function of maximum and minimum capacitances 52, 54, 56 and 58 as measured from the first and second sensors 40 and 42. The separation between the first and second objects 36 and 38 is given by the following equation:

$$S = K \times f\left[\frac{C1, \max - C1, \min}{C2, \max - C2, \min}\right] \quad (1)$$

where: S is the separation between two objects;

K is a constant term that is a function of geometry of the first and second sensors 40 and 42;

$C_{1,max}$ is the maximum capacitance 52 detected from first sensor 40;

$C_{1,min}$ is the minimum capacitance 54 detected from first sensor 40;

$C_{2,max}$ is the maximum capacitance 56 detected from second sensor 42; and $C_{2,min}$ is the minimum capacitance 58 detected from second sensor 42.

Thus, by sensing the maximum and minimum capacitances 52, 54, 56 and 58 through the first and second sensors 40 and 42, the separation (S) between first and second objects 36 and 38 may be established by equation (1). The capacitances 52, 54, 56 and 58 may be measured by exciting the first and second sensors 40 and 42 and subsequently measuring a phase difference between excitation signals and respective reflected signals. The measurement of the capacitances by the first and second sensors 40 and 42 and the processing of such measurements will be described in detail below.

Figure 5:
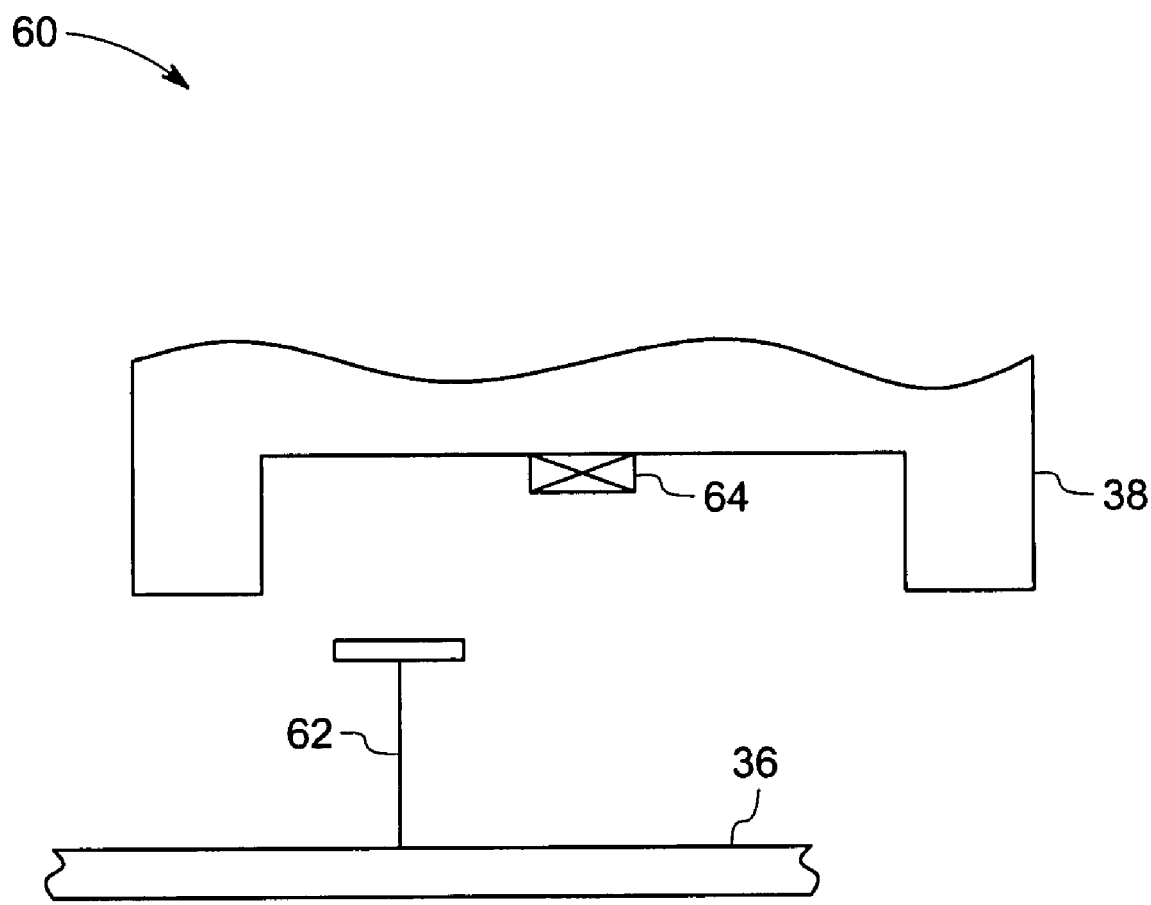
FIG. 5 is a diagrammatical side illustration of the sensor system of FIG. 2 in accordance with another embodiment of the present technique.

FIG. 5 illustrates a sensor system 60 in accordance with another embodiment of the present technique. In a presently contemplated configuration, the sensor system 60 includes a sensor 62 disposed on the first object 36. In this embodiment, the sensor 62 is a capacitive probe. A reference geometry 64 is disposed on the second object 38. Examples of such reference geometry 64 include recesses, such as indents, notches, grooves, slots, and so forth. For example, in a gas turbine, a semi-circular notch on seal teeth may function as the reference geometry 64. In certain embodiments, other profiles of the reference geometry 64 may be employed. In one embodiment, the first and second objects 36 and 38 include stationary and moving objects respectively. The sensor 62 is configured to generate a signal representative of a sensed parameter from the second object 38. In addition, the sensor 62 is configured to generate a signal representative of a sensed parameter from the reference geometry 64. In this embodiment, the sensed parameter is a capacitance. As described above with reference to equation (1), the signals from the sensor 62 corresponding to sensed parameters from the second object 38 and the reference geometry 64 are processed based upon the ratiometric technique to estimate the clearance between the first and second objects 36 and 38.

Figure 6:
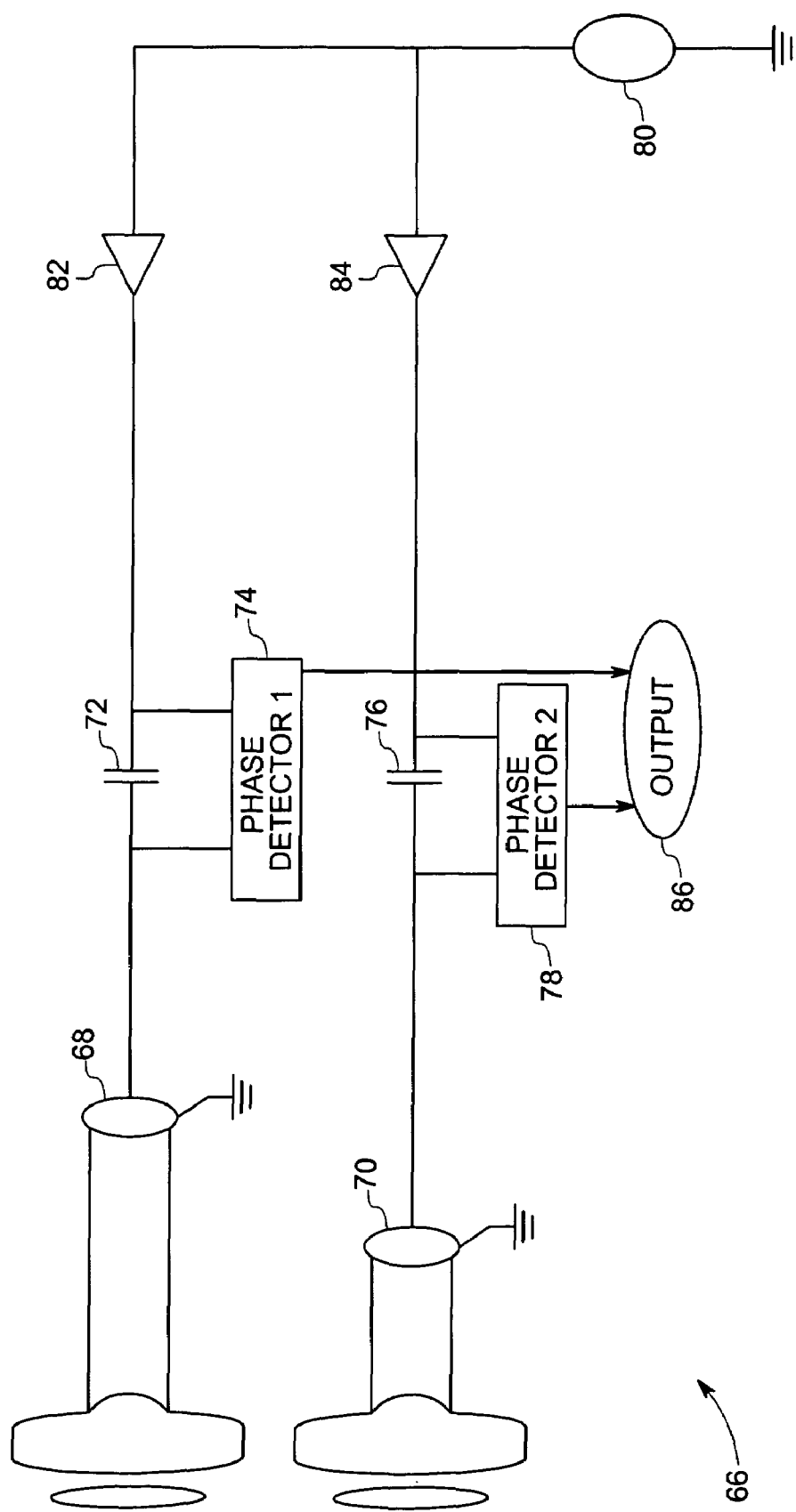
FIG. 6 is a diagrammatical illustration of the sensor system of FIG. 3 in accordance with an embodiment of the present technique.

FIG. 6 illustrates an exemplary configuration 66 of the sensor system of FIG. 3 in accordance with certain embodiments of the present technique. The sensor system 66 comprises first and second sensors 68 and 70 configured to generate first and second signals representative of first and second capacitances. A capacitor 72 and a phase detector 74 are coupled to the first sensor 68 for measuring the capacitance through the first sensor 68. Similarly, a capacitor 76 and a phase detector 78 are coupled to the second sensor 70 for measuring the capacitance through the second sensor 70. In certain embodiments, a directional coupler may be coupled to the first and second sensors 68 and 70 for separating incident and reflected signals. In addition, a signal generator 80 is coupled to the first and second sensors 68 and 70 for exciting the first and second sensors 68 and 70. Further, amplifiers 82 and 84 are coupled to the signal generator 80 to amplify input signals generated from the signal generator 80.

In operation, the first and second sensors 68 and 70 are excited by the signal generator 80 at an excitation frequency. The excitation frequency may be selected based upon a wire capacitance, geometry of sensors 68 and 70 and a static measurement capacitance. In a present embodiment, the phase detector 74 is configured to detect a first reflected signal based upon the excitation frequency to generate the first measurement signal. The capacitance through the first sensor 68 is measured by measuring a phase difference between the excitation signal and the corresponding reflected signal by the capacitor 72 and the phase detector 74. Similarly, the second measurement signal representative of the capacitance through the second sensor 70 is generated by measuring a phase difference between the excitation signal and the corresponding reflected signal by the capacitor 76 and the phase detector 78. The first and second measurement signals are then transmitted to an output 86 for calculation of clearance based upon a ratio of the first and second measurement signals as described above with reference to equation (1).

Figure 7:
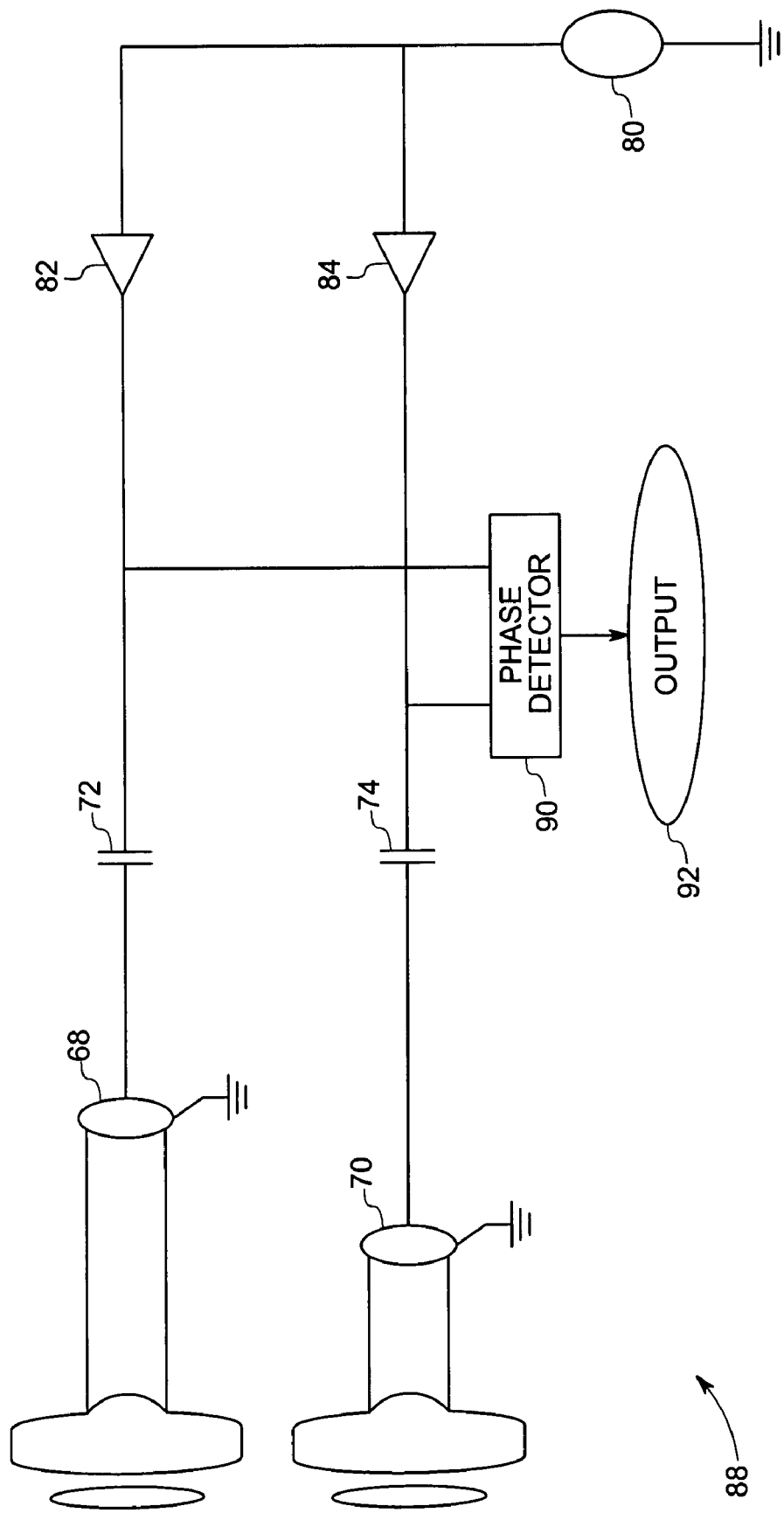
FIG. 7 is a diagrammatical illustration of the sensor system of FIG. 3 in accordance with another embodiment of the present technique.

FIG. 7 illustrates another exemplary configuration 88 of the sensor system of FIG. 3 in accordance with certain embodiments of the present technique. In this embodiment, a single phase detector 90 is coupled to the first and second sensors 68 and 70 for measuring a phase difference between input signals and corresponding reflected signals from the first and second sensors 68 and 70 to measure capacitances across the capacitors 72 and 74. In this embodiment, the first and second measurement signals representative of the capacitances across the capacitors 72 and 74 are then transmitted to an output 92 for processing of the first and second measurement signals for clearance measurement. Again, the clearance between two objects may be established by using the ratiometric technique as described above with reference to equation (1).

Figure 8:
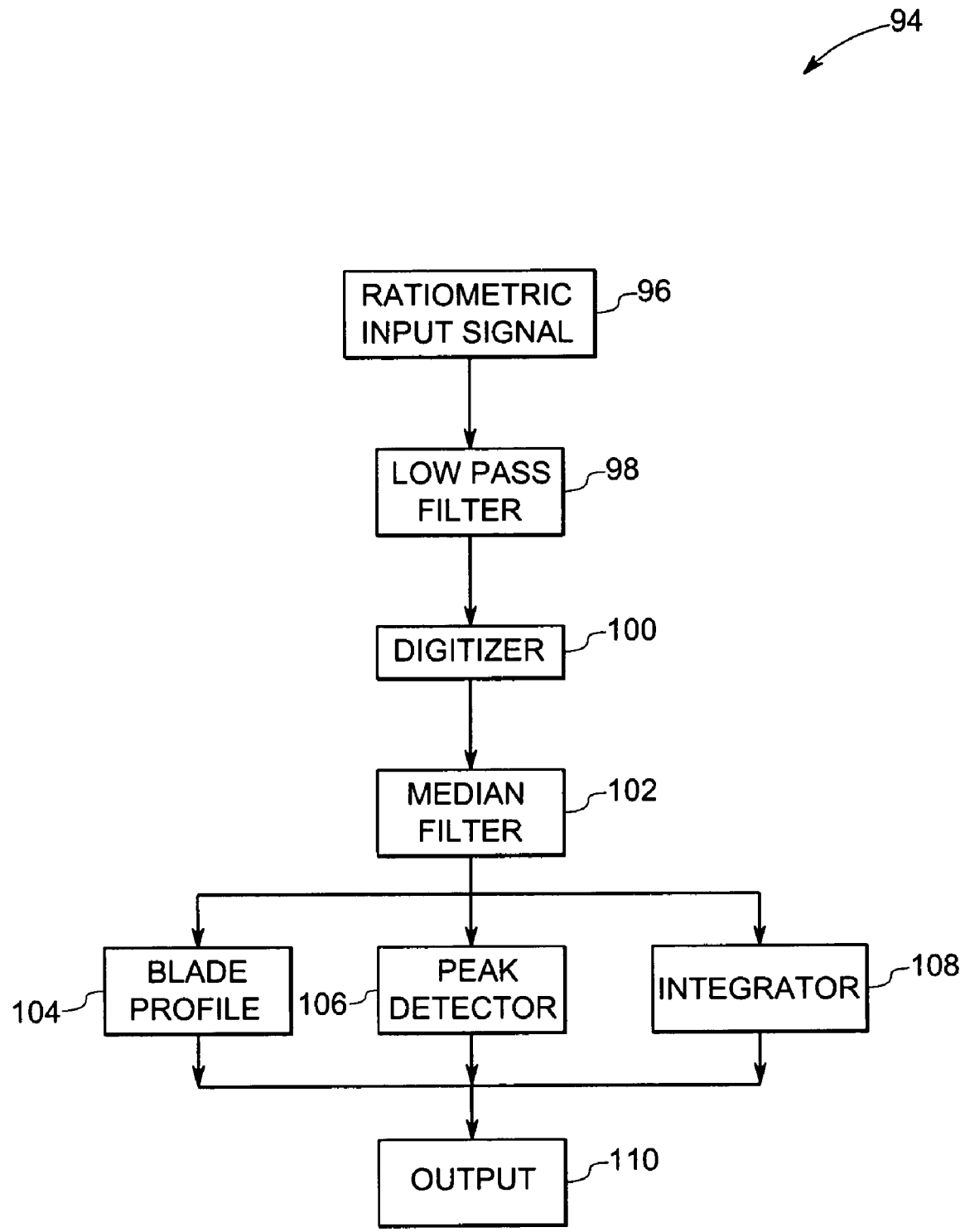
FIG. 8 is a flow chart illustrating a method of operation for the sensor systems of FIG. 6 and FIG. 7 in accordance with an embodiment of the present technique.

FIG. 8 is a flow chart illustrating a process 94 for operating the sensor systems of FIG. 6 and FIG. 7 in accordance with certain embodiments of the present technique. In particular, the process 94 involves signal processing of measurement signals from the sensor systems of FIGS. 6 and 7. The signal processing begins at block 96 where a ratiometric input signal is received. In this embodiment, the ratiometric input signal is a capacitive measurement that is representative of a positional interrelationship between two objects. The ratiometric input signal may be generated by various sensor configurations as described above for measuring clearance between two objects. For example, a two sensor configuration may be used as described above with reference to FIG. 3 for generating the ratiometric input signal. Alternatively, the sensor configuration of FIG. 5 may be employed to generate the ratiometric input signal, where the ratiometric input signal is a function of ratio of signals corresponding to an object and a reference geometry disposed on the object.

The ratiometric input signal is then filtered through a low pass filter or an anti-aliasing filter for smoothing the ratiometric input signal by attenuating the signal outside a desired bandwidth (block 98). Next, the filtered signal is converted from analog data to a digital representation by a digitizer as represented by block 100. Further, a median filter may be employed to filter any noise from the digitized signal (block 102). The filtered signal may be used for calculation of various characteristics. In certain embodiments, the profile of an object may be obtained by using this signal. For example, in a turbine, a profile of the turbine blade may be obtained through the measured signal (block 104). In this embodiment, multiple measurements of the distance of the turbine blade from the sensor configuration may be made that can be used for calculating the profile of the turbine blade. In addition, the signal may be processed through a peak detector to detect a peak-to-peak signal level to estimate the clearance between two objects (block 106). The signal may also be used for identifying trends in data for different parameters, such as clearance at different point in time, through an integrator during operation of the system (block 108). Finally, the details of the profile, clearance statistics, and trends in different parameters are transmitted to an output that may be used for clearance control in the system (block 110).

Figure 9:
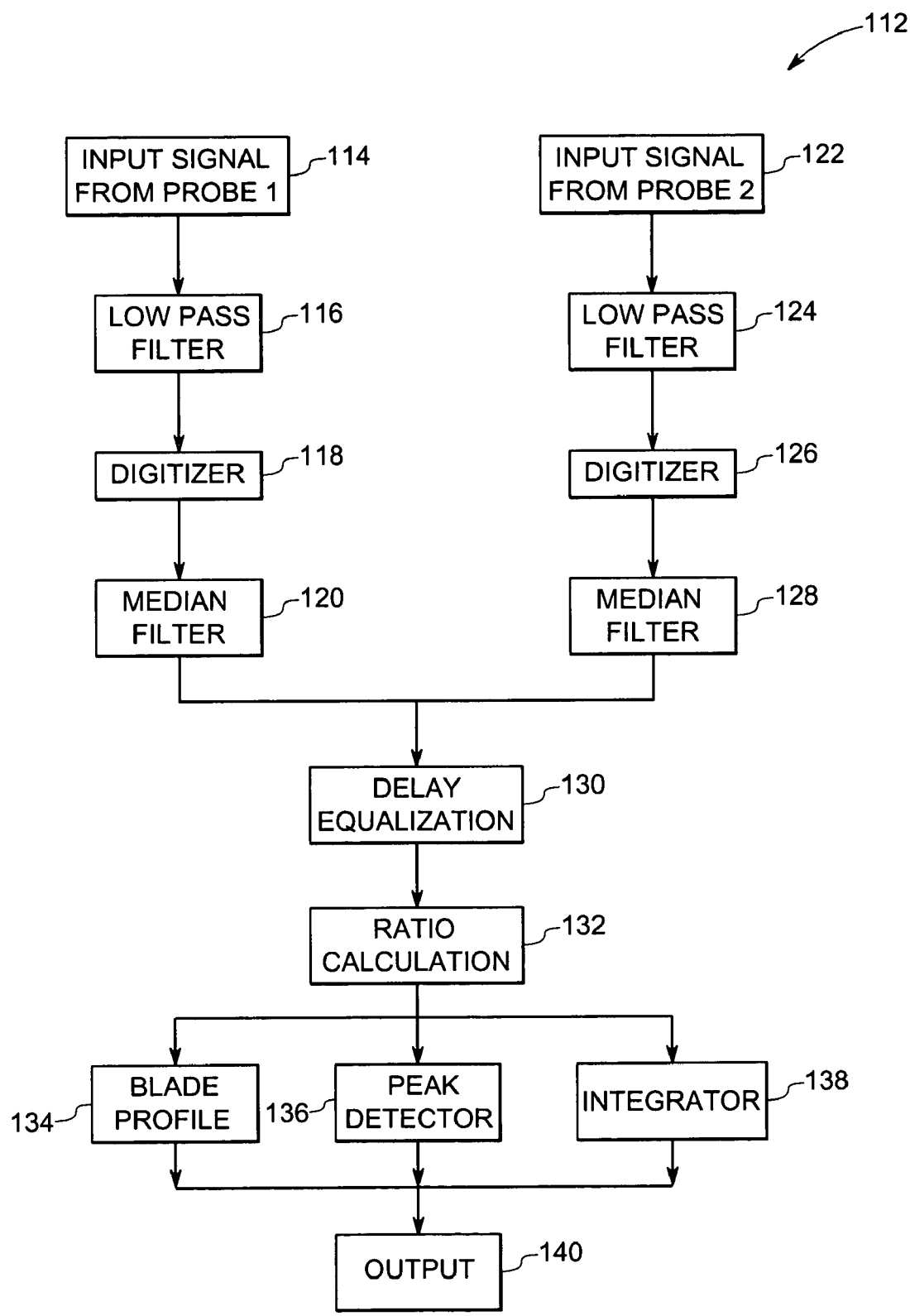
FIG. 9 is a flow chart illustrating a method of operation for the sensor systems of FIG. 6 and FIG. 7 in accordance with another embodiment of the present technique.

FIG. 9 is a flow chart illustrating another process 112 for operating the sensor systems of FIG. 6 and FIG. 7 in accordance with certain embodiments of the present technique. The process 112 includes signal processing of measurement signals from the sensor systems of FIGS. 6 and 7. In this embodiment, an input signal from a first probe is received as shown by block 114. Next, the input signal is filtered by a low pass filter and subsequently converted from analog to digital data as represented by blocks 116 and 118. The signal is then filtered by a median filter to filter any noise in the signal (block 120).

In a present embodiment, an input signal from a second probe is also processed in a similar manner to achieve a filtered signal as represented by blocks 122, 124, 126, and 128. At block 130, the filtered signals from first and second probes are processed for any delay equalization. The process 112 then proceeds by calculating a ratio of the two signals (block 132). Again, as described above, the calculated ratio of the two signals from the first and second probes is used for measuring clearance between two objects, for generating a profile of an object, and for identifying trends in data for parameters (blocks 134, 136, and 138). The processed data is made available to an output 140 where it can be used for clearance control in the system.

Figure 10:
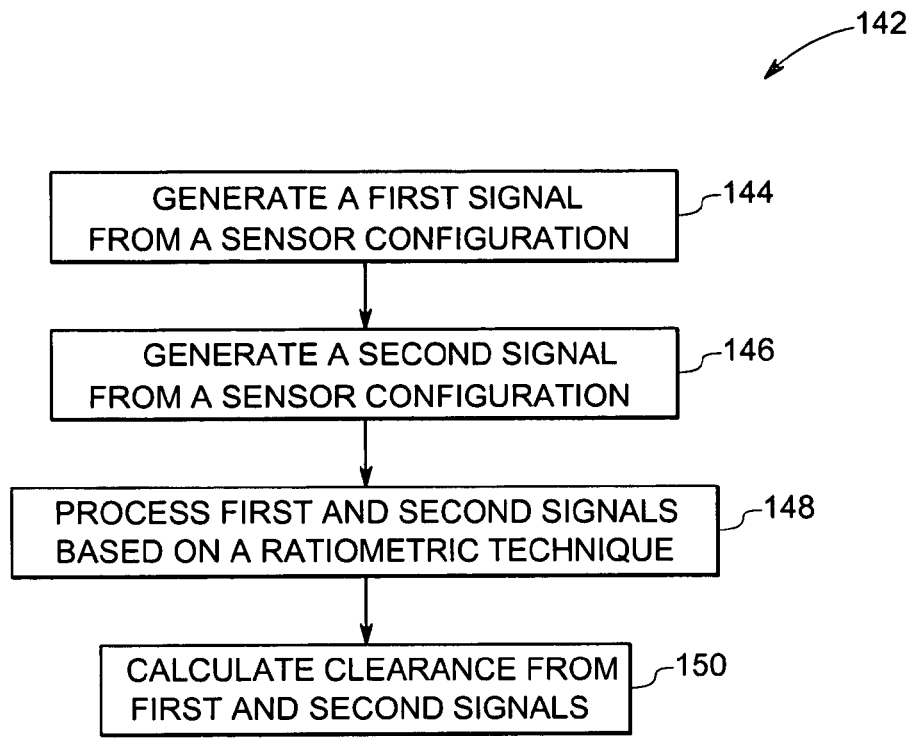
FIG. 10 is a flow chart illustrating a method of measuring a clearance between two objects with a sensor system in accordance with embodiments of the present technique.

FIG. 10 is a flow chart that illustrates an exemplary process 142 of measuring a clearance between two objects with a sensor system in accordance with certain embodiments of the present technique. The process 142 begins with generating a first signal representative of a first sensed parameter from a sensor configuration (block 144). In this embodiment, the sensor configuration is disposed proximate first and second objects. Next, at block 146, a second signal representative of a second sensed parameter is generated from the sensor configuration. In one embodiment, the sensor configuration comprises two sensors configured to generate two signals. Alternatively, the sensor configuration comprises a sensor that is configured to generate signals corresponding to a position of an object and a reference geometry. In some embodiments, the sensor configuration comprises capacitance probes, and the first and second sensed parameters comprise capacitance. In addition, embodiments of the first and second signals correspond to a positional interrelationship between the first and second objects, such as the clearance between the first and second objects. At block 148, the first and second signals are processed based on a ratiometric technique to estimate a ratio of the first and second signals, as described above with reference to equation (1). Finally, the clearance between the first and second objects is calculated from the first and second signals as a function of a ratio of the first and second sensed parameters (block 150).

Figure 11:
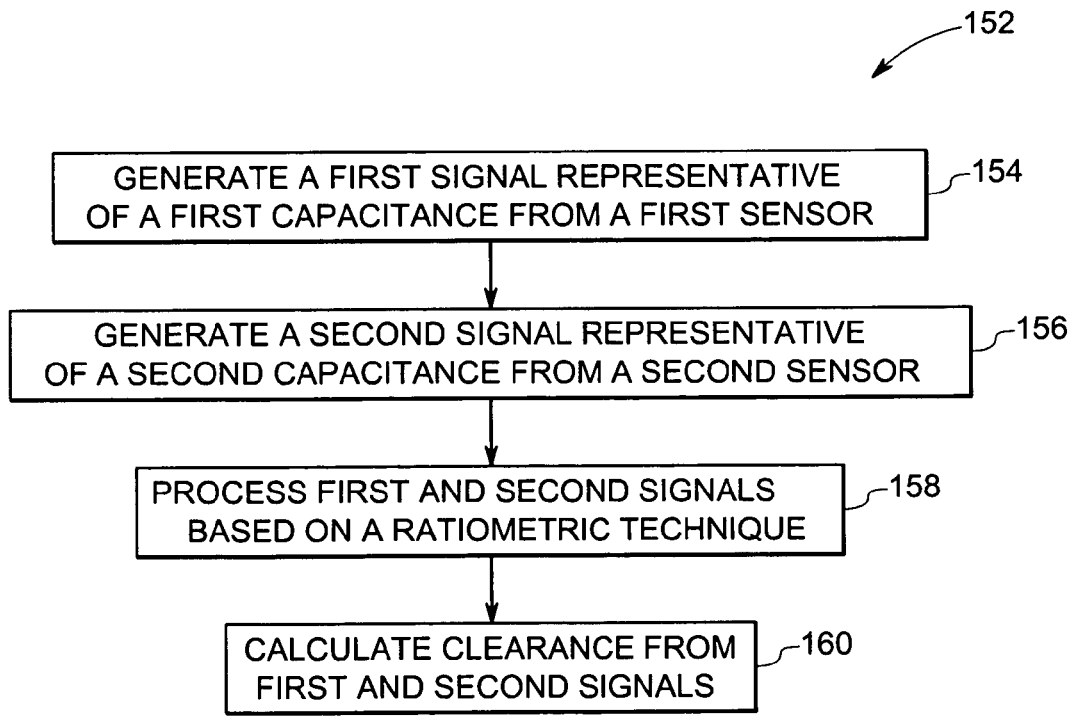
FIG. 11 is a flow chart illustrating a method of measuring a clearance between two objects with the sensor system of FIG. 3 in accordance with embodiments of the present technique.

FIG. 11 is a flow chart that illustrates a process 152 of measuring clearance between first and second objects with the sensor system of FIG. 3 in accordance with certain embodiments of the present technique. The process begins with generating a first signal representative of a first capacitance from a first sensor disposed on the first object at a first location (block 154). Next, a second signal representative of a second capacitance is generated from a second sensor that is disposed on the first object at a second location different from the first location (block 156). At block 158, the first and second signals representative of the first and second capacitances are processed based on the ratiometric technique to estimate a ratio of the first and second capacitances as described above with reference to equation 1. Finally, the clearance between the first and second objects is calculated from the ratio of the first and second capacitances (block 160).

Figure 12:
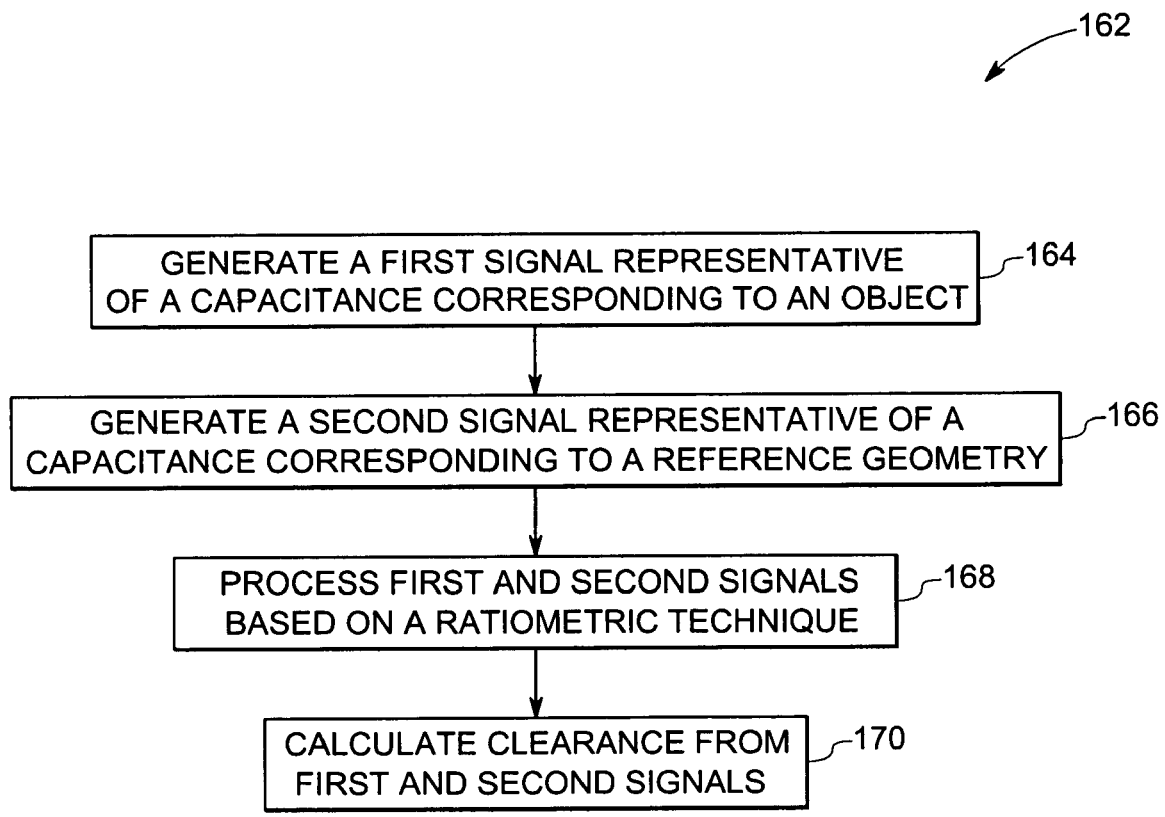
FIG. 12 is a flow chart illustrating a method of measuring a clearance between two objects with the sensor system of FIG. 5 in accordance with embodiments of the present technique.

FIG. 12 is a flow chart that illustrates another exemplary process 162 of measuring a clearance between first and second objects with the sensor system of FIG. 5 in accordance with certain embodiments of the present technique. The process 162 begins with generating a first signal representative of a capacitance corresponding to an object (block 164). In this embodiment, the sensor is disposed on the first object and the first signal corresponds to a positional interrelationship between first and second objects. Next, at block 166, a second signal representative of a capacitance corresponding to a reference geometry is generated. In this embodiment, the reference geometry is disposed on the second object and the second signal corresponds to a positional interrelationship between the first object and the reference geometry.

In certain embodiments of the process 162, the first and second signals are generated by performing a plurality of phase measurements to determine a phase between each of reflected signals and the respective first and second excitation signals. The first and second signals generated from the sensor are processed based upon the ratiometric technique as described above with reference to equation (1) (block 168). Finally, the clearance between the first and second objects is calculated from the first and second signals (block 170). The calculated clearance between the first and second objects may be used for controlling the clearance between first and second objects.

The various aspects of the method described hereinabove have utility in different applications. For example, the technique illustrated above may be used for measuring the clearance between rotating and static components in an aircraft engine. The technique may also be used in certain other applications, for example, for measuring clearance between objects in gas turbines, steam turbines, and so forth. As noted above, even more generally, the method described herein may be advantageous for providing accurate measurement of clearance between objects through sensors by employing a ratiometric technique to process signals from multiple sensors. Further, the technique is particularly advantageous to provide a self-calibrating sensor system for accurate clearance measurement of parts, even in operation and over extended periods of time, enabling better clearance control in parts while in operation.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for measuring clearance between a first object and a second object, comprising:
   a sensor configuration to generate a first signal representative of a first sensed parameter and a second signal representative of a second sensed parameter; and
   a clearance measurement unit configured to process the first and second signals based upon a ratiometric technique to calculate clearance between the first and second objects;
   wherein the ratiometric technique is based on an equation:

$$S = K \times f\left[\frac{C1, \max - C1, \min}{C2, \max - C2, \min}\right],$$

wherein S is the clearance between the first and second objects, K is a constant term that is a function of geometry of first and second sensors, C1, max is a maximum capacitance detected from the first sensor, C1, min is a minimum capacitance detected from the first sensor, C2, max is a maximum capacitance detected from the second sensor, and C2, min is a minimum capacitance detected from the second sensor.

2. The system of claim 1, wherein the sensor configuration comprises a sensor disposed on the first object or the second object.

3. The system of claim 1, wherein the sensor configuration comprises a sensor disposed on the first object and a reference geometry disposed on the second object, wherein the sensor is configured to generate first and second signals representative of the first and second sensed parameters from the second object and the reference geometry.

4. The system of claim 1, wherein the sensor configuration comprises a capacitive probe and the first and second sensed parameters comprise capacitance measurements, and wherein the ratiometric measurement technique is configured to calculate the clearance as a function of a ratio of the first and second sensed parameters.

5. The system of claim 1, wherein the sensor system is configured to measure the clearance as the first object moves relative to the second object in a turbine engine.

6. The system of claim 5, wherein the first object comprises a rotatable blade and the second object comprises a casing disposed about the rotatable blade.

7. The system of claim 1, further comprising:
   a phase detection module configured to detect a plurality of reflected signals to generate the first and second signals; and
   a signal generator configured to supply an excitation signal to the sensor configuration for generating the first and second signals.

8. The system of claim 1, further comprising a clearance control unit coupled to the clearance measurement unit for controlling the clearance between the first and second objects based on the clearance calculated by the clearance measurement unit.

9. A system for measuring clearance between a first object and a second object, comprising:
   a first sensor disposed at a first location, wherein the first sensor is configured to generate a first signal representative of a first sensed parameter;

a second sensor disposed at a second location, wherein the second sensor is configured to generate a second signal representative of a second sensed parameter; and a clearance measurement unit configured to process the first and second signals based upon a ratiometric technique to calculate clearance between the first and second objects;

wherein the ratiometric technique is based on an equation:

$$S = K \times f\left[\frac{C1, \max - C1, \min}{C2, \max - C2, \min}\right],$$

wherein S is the clearance between the first and second objects, K is a constant term that is a function of geometry of first and second sensors, C1, max is a maximum capacitance detected from the first sensor, C1, min is a minimum capacitance detected from the first sensor, C2, max is a maximum capacitance detected from the second sensor, and C2, min is a minimum capacitance detected from the second sensor.

10. The system of claim 9, further comprising:
a phase detection module configured to detect a plurality of reflected signals from respective ones of the first and second sensors to generate the first and second signals;
a signal generator configured to supply excitation signals to the first and second sensors for generating the first and second signals; and
a clearance control unit coupled to the clearance measurement unit for controlling the clearance between the first and second objects based on the clearance calculated by the clearance measurement unit,
wherein the first and second sensors are capacitive probes, and the first and second sensed parameters are capacitances.

11. A system, comprising:
a ratiometric sensor configuration disposed on a stationary object, wherein the ratiometric sensor configuration is configured to generate signals representative of respective sensed parameters from a movable object; and
a clearance measurement unit configured to process the signals based upon a ratiometric technique to calculate clearance between the movable and stationary objects;
wherein the ratiometric technique is based on an equation:

$$S = K \times f\left[\frac{C1, \max - C1, \min}{C2, \max - C2, \min}\right],$$

wherein S is the clearance between the stationary and movable objects, K is a constant term that is a function of geometry of first and second sensors, C1, max is a maximum capacitance detected from the first sensor, C1, min is a minimum capacitance detected from the first sensor, C2, max is a maximum capacitance detected from the second sensor, and C2, min is a minimum capacitance detected from the second sensor.

12. The system of claim 11, wherein the sensor comprises a capacitive probe, and the sensed parameters are capacitances.

13. The system of claim 11, further comprising:
a phase detection module configured to detect a phase difference between a plurality of reflected signals from the movable object to generate the signals representative of the sensed parameters;

a signal generator configured to supply excitation signals to the sensor for generating the first and second signals; and
a clearance control unit coupled to the clearance measurement unit for controlling the clearance between the movable and stationary objects based on the clearance calculated by the clearance measurement unit.

14. The system of claim 11, wherein the ratiometric sensor configuration comprises a plurality of sensors disposed at different distances relative to the movable object, or the ratiometric sensor configuration comprises a sensor that transmits and reflects signals on the movable object at different distances relative to the sensor.

15. A method of measuring clearance between a first object and a second object, comprising:
generating a first signal representative of a first sensed parameter from a sensor configuration proximate the first and second objects;
generating a second signal representative of a second sensed parameter from the sensor configuration; and
processing the first and second signals based upon a ratiometric technique to calculate the clearance between the first and second objects;
wherein the ratiometric technique is based on an equation:

$$S = K \times f\left[\frac{C1, \max - C1, \min}{C2, \max - C2, \min}\right],$$

wherein s is the clearance between the first and second objects, K is a constant term that is a function of geometry of first and second sensors, C1, max is a maximum capacitance detected from the first sensor, C1, min is a minimum capacitance detected from the first sensor, C2, max is a maximum capacitance detected from the second sensor, and C2, min is a minimum capacitance detected from the second sensor.

16. The method of claim 15, wherein generating the first and second signals comprises generating the first and second signals via first and second sensors, wherein the first and second sensors are disposed on one of the first or second objects, and wherein generating the first and second signals comprises measuring first and second capacitance values as the first and second sensed parameters.

17. The method of claim 15, wherein generating the first signal comprises generating a signal representative of the sensed parameter corresponding to a position of one of the first or second objects.

18. The method of claim 15, wherein processing the first and second signals comprises performing a plurality of phase measurements to determine a phase between each of reflected signals and the respective first and second signals.

19. The method of claim 15, further comprising controlling the clearance between the first and second objects based upon the calculated clearance.

20. A method of measuring a clearance between a first object and a second object, comprising:
generating a first signal representative of a first sensed parameter corresponding to one of the first or second objects;
generating a second signal representative of a second sensed parameter corresponding to one of the first or second objects, wherein the first and second signals comprise a phase difference relative to one another; and
processing the first and second signals based upon a ratiometric technique to calculate the clearance between the first and second objects;

wherein the ratiometric technique is based on an equation:

$$S = K \times f\left[\frac{C1, \max - C1, \min}{C2, \max - C2, \min}\right],$$

wherein S is the clearance between the first and second objects, K is a constant term that is a function of geometry of first and second sensors, C1, max is a maximum capacitance detected from the first sensor, C1, min is a minimum capacitance detected from the first sensor, C2, max is a maximum capacitance detected from the second sensor, and C2, min is a minimum capacitance detected from the second sensor.

21. The method of claim 20, wherein generating the first and second signals comprises measuring first and second capacitance values as the first and second sensed parameters.

22. The method of claim 20, wherein processing the first and second signals comprises performing a plurality of phase measurements to determine a phase between each of reflected signals and the respective first and second signals.

* * * * *